(12) United States Patent
Kempshall

(10) Patent No.: US 12,017,743 B1
(45) Date of Patent: Jun. 25, 2024

(54) ENCAPSULATED MAGNETO HYDRODYNAMIC DRIVE

(71) Applicant: Hyalta Aeronautics, Inc., St. Petersburg, FL (US)

(72) Inventor: Scott R. Kempshall, St. Petersburg, FL (US)

(73) Assignee: Hyalta Aeronautics, Inc., St. Petersburg, FL (US)

( * ) Notice: Subject to any disclaimer, the term of this patent is extended or adjusted under 35 U.S.C. 154(b) by 0 days.

(21) Appl. No.: 18/196,035

(22) Filed: May 11, 2023

Related U.S. Application Data

(63) Continuation of application No. 17/205,654, filed on Mar. 18, 2021, now Pat. No. 11,685,493.

(60) Provisional application No. 62/991,210, filed on Mar. 18, 2020.

(51) Int. Cl.
| | |
|---|---|
| *H02K 44/12* | (2006.01) |
| *B63H 11/02* | (2006.01) |
| *H02K 44/04* | (2006.01) |

(52) U.S. Cl.
CPC ........... *B63H 11/025* (2013.01); *H02K 44/04* (2013.01); *H02K 44/12* (2013.01)

(58) Field of Classification Search
CPC ....... B63H 11/025; H02K 44/04; H02K 44/12
See application file for complete search history.

(56) References Cited

U.S. PATENT DOCUMENTS

| | | | | | |
|---|---|---|---|---|---|
| 3,138,129 | A | * | 6/1964 | Bankston | B63H 11/025 114/20.1 |
| 3,662,554 | A | * | 5/1972 | De Broqueville | B63B 1/32 244/1 N |
| 4,663,932 | A | * | 5/1987 | Cox | F03H 99/00 505/902 |
| 4,795,113 | A | * | 1/1989 | Minovitch | B64G 1/14 104/282 |
| 5,197,279 | A | * | 3/1993 | Taylor | H02N 11/006 60/200.1 |
| 5,359,574 | A | * | 10/1994 | Nadolink | B63G 8/34 367/1 |

(Continued)

FOREIGN PATENT DOCUMENTS

JP 3194638 B2 * 7/2001 ........... B63H 11/025

*Primary Examiner* — Pedro J Cuevas

(74) *Attorney, Agent, or Firm* — Nicholas Pfeifer; Smith & Hopen, P. A.

(57) ABSTRACT

A fluid propulsion system configured to propel an ambient fluid through a propulsion channel. To do so, the present invention includes a hollow main body having a propulsion channel extending therethrough. The main body includes a base structure, a flexible bladder attached thereto, and a fluid (e.g., liquid, gas, or plasma) enclosed within the bladder. The present invention further includes a field source that produces an electromagnetic or magnetic field. The bladder and/or the enclosed fluid is configured to respond to the electromagnetic or magnetic field. Movement of the bladder in response to energization of the field sources alters the amount of occlusion of the propulsion channel. Energizing sequential field sources causes the occluded section of the bladder to propel the ambient fluid through the propulsion channel creating a reactionary force to propel the fluid propulsion system in the opposite direction.

19 Claims, 7 Drawing Sheets

(56) References Cited

U.S. PATENT DOCUMENTS

| | | | | |
|---|---|---|---|---|
| 5,431,083 A * | 7/1995 | Vassioukevitch | F41B 6/006 | 89/8 |
| 5,435,761 A * | 7/1995 | Shimamune | B63H 11/025 | 440/6 |
| 5,483,863 A * | 1/1996 | Dreizin | F41B 6/006 | 89/8 |
| 6,310,406 B1 * | 10/2001 | Van Berkel | F03B 17/061 | 290/43 |
| 6,352,455 B1 * | 3/2002 | Guagliano | F04B 53/123 | 60/201 |
| 6,492,784 B1 * | 12/2002 | Serrano | F03H 99/00 | 60/202 |
| 6,939,290 B2 | 9/2005 | Iddan | A61B 5/067 | 600/109 |
| 7,077,047 B2 * | 7/2006 | Frasca | F41B 6/006 | 89/8 |
| 7,950,379 B2 * | 5/2011 | Tidman | F41B 3/04 | 124/56 |
| 8,262,424 B1 * | 9/2012 | Ross | B63H 11/06 | 60/221 |
| 8,302,584 B1 * | 11/2012 | Lu | F41B 6/003 | 124/3 |
| 8,459,002 B2 * | 6/2013 | McLean | F03H 99/00 | 60/202 |
| 9,062,949 B1 * | 6/2015 | Clemen, Jr. | F42B 6/006 | |
| 10,006,446 B2 * | 6/2018 | Purvis | F03H 99/00 | |
| 10,082,360 B2 * | 9/2018 | Hartman | F41B 6/006 | |
| 10,218,251 B2 * | 2/2019 | Hartman | H02K 41/031 | |
| 10,294,927 B1 * | 5/2019 | Hawk | F03G 3/00 | |
| 10,511,215 B2 * | 12/2019 | Hartman | H02K 41/031 | |
| 10,513,353 B2 * | 12/2019 | Purvis | H01F 7/20 | |
| 10,527,384 B2 * | 1/2020 | Hartman | F41B 6/003 | |
| 10,907,928 B1 * | 2/2021 | Timpson | F41B 6/003 | |
| 10,976,129 B1 * | 4/2021 | Timpson | F41B 6/003 | |
| 10,976,130 B1 * | 4/2021 | Timpson | F41B 6/006 | |
| 10,982,926 B2 * | 4/2021 | Hartman | F41B 6/003 | |
| 11,073,357 B2 * | 7/2021 | Hartman | F41B 6/003 | |
| 11,186,462 B1 * | 11/2021 | Leger | B65H 75/2437 | |
| 11,309,783 B2 * | 4/2022 | Hartman | H02K 11/0094 | |
| 2003/0214580 A1 * | 11/2003 | Iddan | G01J 3/0291 | 348/81 |
| 2006/0283171 A1 * | 12/2006 | Metcalfe | F03H 1/0037 | 60/202 |
| 2009/0288385 A1 * | 11/2009 | Metcalfe, III | F03H 1/0037 | 60/202 |
| 2017/0343314 A1 * | 11/2017 | Hartman | F41B 6/003 | |
| 2017/0346378 A1 * | 11/2017 | Hartman | H02K 41/031 | |
| 2018/0086450 A1 * | 3/2018 | Park | B60F 5/02 | |
| 2018/0109171 A1 * | 4/2018 | Hartman | H02K 41/02 | |
| 2018/0347936 A1 * | 12/2018 | Hartman | F41B 6/003 | |
| 2020/0025507 A1 * | 1/2020 | Hartman | F41B 6/006 | |
| 2020/0182583 A1 * | 6/2020 | Hartman | F41B 6/006 | |

* cited by examiner

ENCAPSULATED MAGNETO HYDRODYNAMIC DRIVE

CROSS-REFERENCE TO RELATED APPLICATIONS

This nonprovisional application is a continuation of and claims priority to non-provisional application Ser. No. 17/205,654 entitled "ENCAPSULATED MAGNETO HYDRODYNAMIC DRIVE," filed Mar. 18, 2021, which claims priority to provisional application No. 62/991,210, entitled "ENCAPSULATED MAGNETO HYDRODYNAMIC DRIVE," filed Mar. 18, 2020 by the same inventor(s).

BACKGROUND OF THE INVENTION

1. Field of the Invention

This invention relates, generally, to electromagnetic hydrodynamics, magneto hydrodynamic propulsion and magneto hydrodynamic drive systems.

2. Brief Description of the Prior Art

Magneto hydrodynamic propulsion or magneto hydrodynamic drive (MHD) concepts provide nearly silent propulsion for submersible vehicles with no moving parts. These MHD system propel vehicles using only electric and magnetic fields with no moving parts by accelerating an electrically conductive propellant (liquid or gas) with magnetohydrodynamics. The fluid is directed to the rear of a propulsion tube and as a reaction, the vehicle accelerates forward.

The first studies examining MHD in the field of marine propulsion date back to the early 1960s. However, few large-scale working prototypes have been built, as marine MHD propulsion remains impractical due to its low efficiency, which is limited by the low electrical conductivity of seawater. Increasing current density is limited by Joule heating and water electrolysis in the vicinity of electrodes. Increasing the magnetic field strength is limited by the cost, size, and weight (as well as technological limitations) of electromagnets and the power available to feed them. Moreover, MHD systems are far less efficient in fresh water or air because of the lack of electrical conductivity of fresh water and air.

As explained above, previous work in this area involved the ionization of the surrounding fluids, such as sea water. This is a highly inefficient process and resulted in only limited success as a propulsion system. The present invention solves the efficiency problem by encapsulating reactive fluid in a membrane or encapsulating a fluid that is affected by an electro-magnetically reactive membrane. The use of the membrane eliminates the reliance on the electrical conductivity of the surrounding fluid and in turn the inefficiencies in trying to ionize the surrounding fluid. However, in view of the art considered at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a more efficient and effective magnetohydrodynamics based fluid propulsion system is now met by a new, useful, and nonobvious invention.

The fluid propulsion system of the present invention includes a hollow main body comprised of a base structure, a bladder, and an enclosed fluid. A propulsion channel extends through the hollow main body and is configured to receive ambient fluid. Moreover, the enclosed fluid resides in a chamber established at least partially by the base structure and the bladder.

The base structure has a predetermined rigidity greater than the rigidity of the bladder. In some embodiments, the base structure is in the shape of a cylindrical tube. In some embodiments, the base structure includes two opposing plates spaced apart to create the propulsion channel.

The present invention further includes a plurality of longitudinally spaced field sources connected to a power source. Each field source can be independently energized via a power source to create a magnetic field or an electromagnetic field. In some embodiments, each of the plurality of field sources is comprised of a coil.

In some embodiments, each of the plurality of field sources resides within the base structure. In some embodiments, each of the plurality of field sources resides adjacent to an outer surface of the base structure. In some embodiments, the field sources are in mechanical communication with the bladder.

In some embodiments, the enclosed fluid is adapted to react to the magnetic field or the electromagnetic field created by an energized field source. In some embodiments, the enclosed fluid in the bladder is repelled by the magnetic field or the electromagnetic field of the energized field source. In some embodiments, the enclosed fluid in the bladder is attracted to the magnetic field or the electromagnetic field of the energized field source, thereby creating a bulge in the bladder proximate the energized field source.

The bladder is comprised of a flexible material thereby allowing a mass displacement of the enclosed fluid in response to the magnetic field or the electromagnetic field of the energized field source. In turn, the bladder alters a degree of occlusion of the propulsion channel. The plurality of field sources is configured to be sequentially energized to move a location of the mass displacement of the enclosed fluid in the bladder thereby displacing the ambient fluid in the propulsion channel.

Some embodiments further include reactive elements in mechanical communication with the bladder. The reactive elements are configured to reactively move in response to the magnetic field or the electromagnetic field of the energized field source.

In some embodiments, the enclosed fluid is non-reactive to the magnetic/EM fields. Rather, the bladder includes reactive elements adapted to react to the magnetic field or the electromagnetic field created by an energized field source. The flexible material of the bladder allows the bladder to react to movement of the reactive elements in response to the magnetic field or the electromagnetic field of the energized field source. Movement of the reactive elements of the bladder impacts a degree of occlusion of the propulsion channel and the plurality of field sources are adapted to be sequentially energized to move different reactive elements in the bladder thereby displacing the ambient fluid in the propulsion channel.

In some embodiments, the reactive elements in the bladder are repelled by the magnetic field or the electromagnetic field of the energized field source. In some embodiments, the reactive elements in the bladder are attracted to the magnetic field or the electromagnetic field of the energized field source.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
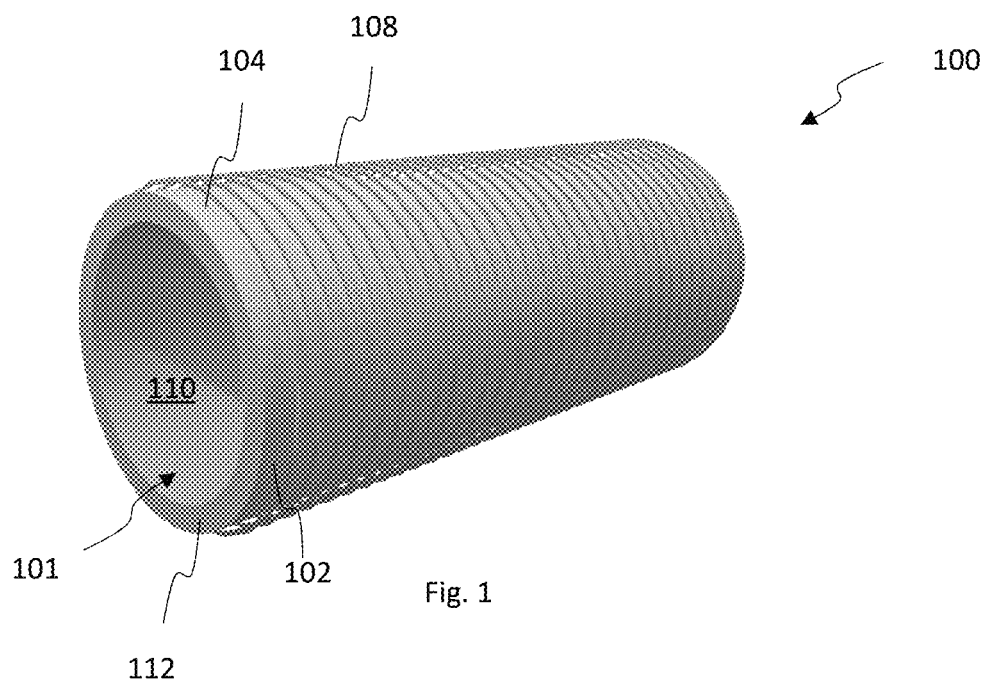
FIG. 1 is a perspective view of an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present includes a fluid propulsion system configured to propel an ambient fluid through a propulsion channel. To do so, the present invention includes a hollow main body having a propulsion channel extending therethrough. The main body includes a base structure, a flexible bladder attached thereto, and a fluid (e.g., liquid, gas, or plasma) enclosed within the bladder. The present invention further includes a field source that produces an electromagnetic or magnetic field. The bladder and/or the enclosed fluid is configured to respond to the electromagnetic or magnetic field. As will be explained in greater detail below, the field source causes the bladder to propel the ambient fluid through the propulsion channel creating a reactionary force to propel the fluid propulsion system in the opposite direction.

The base structure can be a tube (see FIGS. 1-4), plates (see FIGS. 5-6), or other structures configured to create a propulsion channel through which ambient fluid can flow. In some embodiments, the base structure is a rigid or semirigid structure. In some embodiments, the base structure has a degree of rigidity greater than the bladder.

Referring to FIGS. 1-4, an embodiment of propulsion system 100 includes base structure 102 having a cylindrical, tubular shape with propulsion channel 101 extending therethrough. Base structure 102 includes outer surface 104 and inner surface 106 shown in FIGS. 2 and 3. A plurality of field sources in the form of electrical coils 108 resides adjacent to outer surface 104 and bladder 110 resides proximate to inner surface 106.

Figure 2:
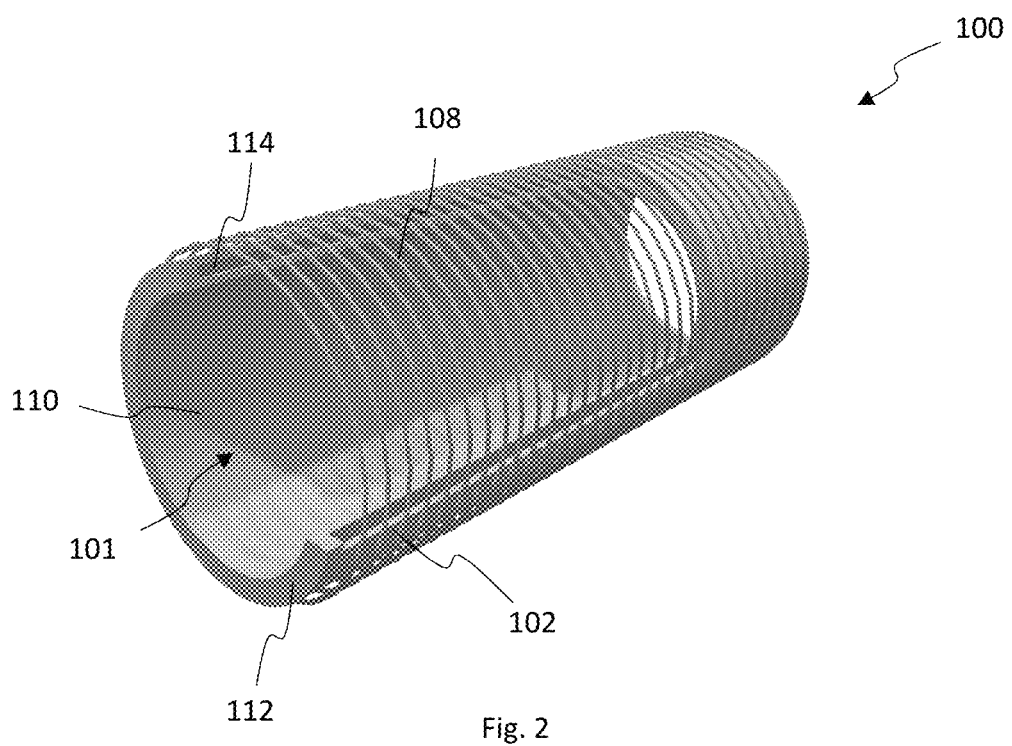
FIG. 2 is a sectional cutout view of an embodiment of the present invention to detail the internal components of the present invention.
Figure 3:
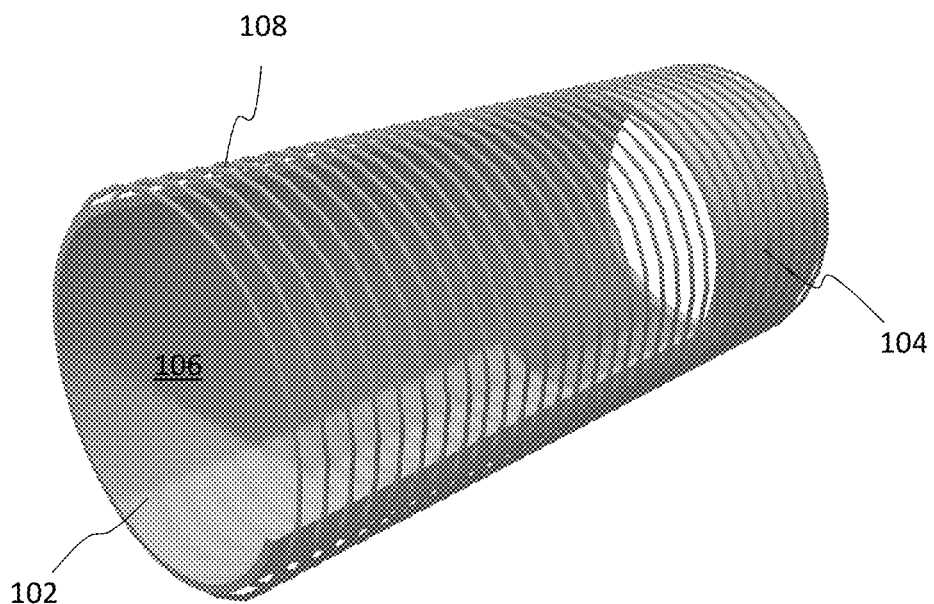
FIG. 3 is a perspective cutout view of an embodiment of the base structure and the field sources of an embodiment of the present invention.
Figure 4:
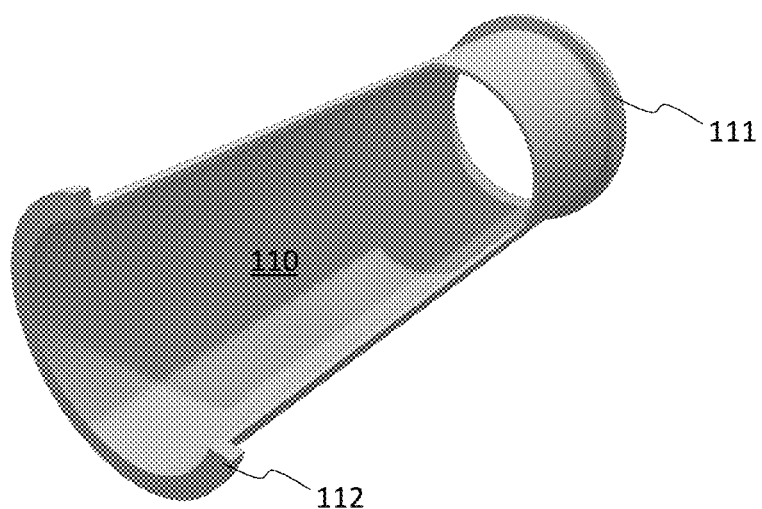
FIG. 4 is a perspective cutout view of an embodiment of the bladder and the end walls of an embodiment of the present invention.
Figure 6:
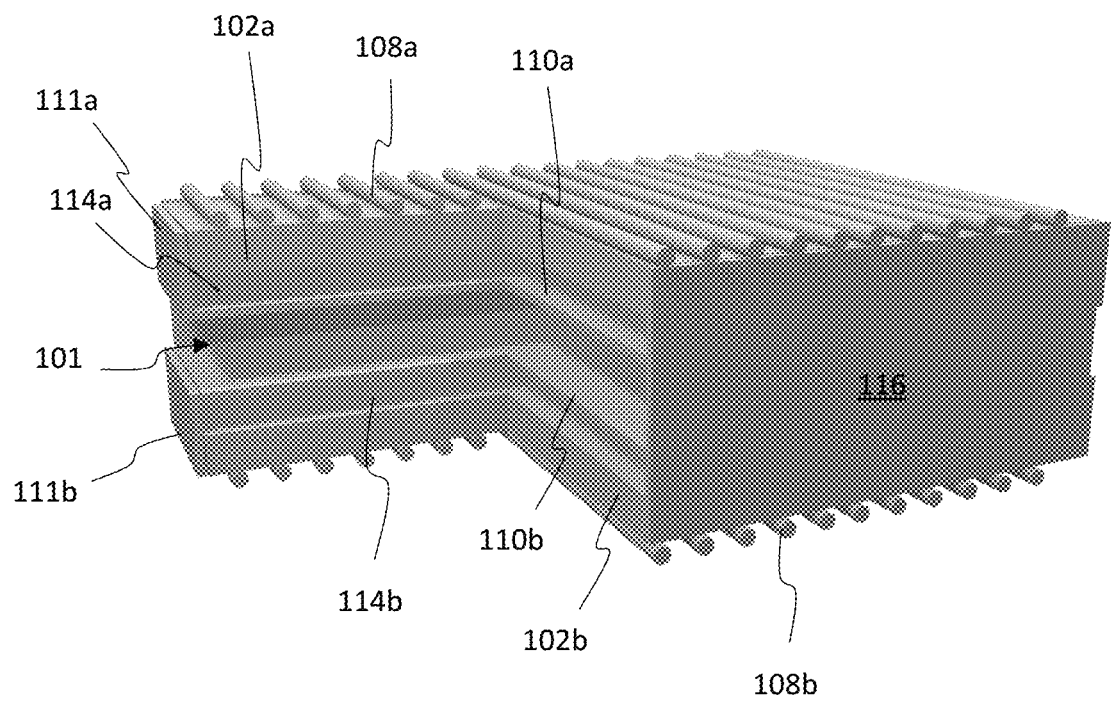
FIG. 6 is a sectional cutout view of an embodiment of the present invention to detail the internal components of the present invention.

The combination of end walls 112, bladder 110, and base structure 102 creates chamber 114, which houses an enclosed fluid. This assembly is best depicted in FIGS. 2 and 6, which include sectional cut away views to better depict chamber 114. A shown in FIGS. 4 and 6, some embodiments include the proximal and distal ends of bladder 110 secured at proximal and distal end walls 111 and 112. In some embodiments, bladder 110 is secured at the innermost location of the end walls 111 and 112. In some embodiments, bladder 110 is secured to base structure 102 in a manner to maintain/establish propulsion channel 101. Thus, there is a propulsion channel 101 running through the assembly of the hollow rigid outer base structure 102 and attached bladder 110 when the system is in a non-reactive state (see e.g., FIG. 7). Propulsion channel 101 extends the length of the assembly to allow for the passage of ambient fluid.

Figure 5:
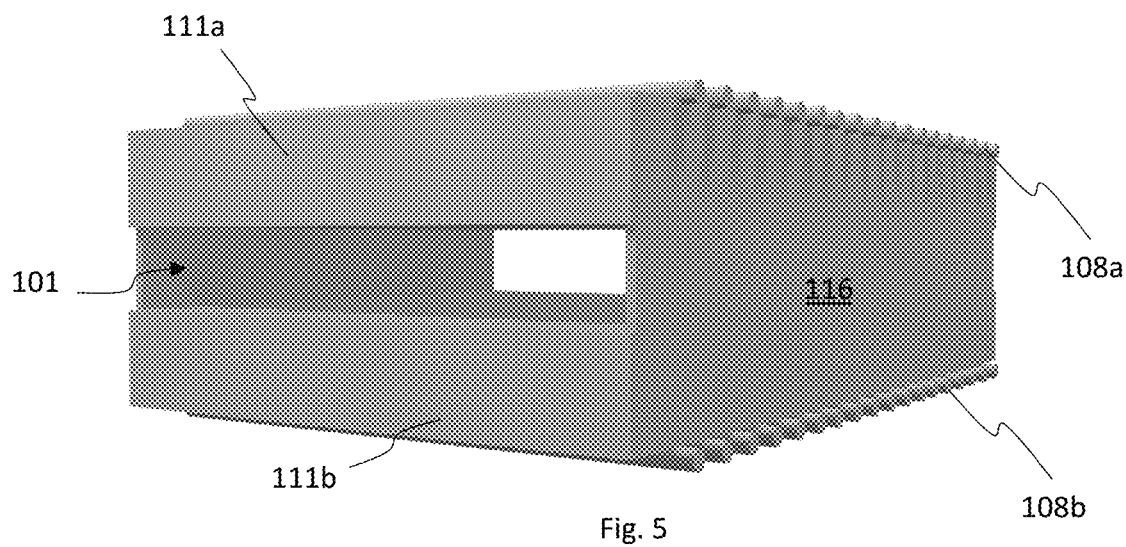
FIG. 5 is a perspective view of an embodiment of the present invention.

FIGS. 5-6 illustrate an embodiment of the present invention having non-cylindrical base structures 102a and 102b to create channel 101. It should be noted that FIG. 6 includes a portion cutaway to reveal the internal workings of the system.

The depicted design includes base structures 102a and 102b in the form of parallel plates. However, some embodiments may include the plates converging towards each other near an aft end of propulsion channel 101 to increase the velocity of the ambient fluid as it exits propulsion channel 101. Some embodiments may have non-parallel plates and/or plates having a non-linear profile moving along the longitudinal axis of the channel.

Each base structure 102a and 102b includes bladder 110a and 110b respectively secured to end walls 111a and 112a and 111b and 112b. Side walls 116 act as structural supports and as side walls for propulsion channel 101 extending between base plates 102. Furthermore, field sources 108a and 108b are adjacent to their respective base plates 102.

Some embodiments include only one bladder between base structures 102. However, one or more field sources 108 can be used to control the movement of the enclosed fluid and bladder.

As shown, field sources 108 may reside adjacent or proximate to outer surface 104 of base structure(s) 102. However, some embodiments include the field sources residing between outer surface 104 and inner surface 106. The location of field sources 108 is dependent on the outward extent of the EM/magnetic fields produced by the field sources. The field sources must be sufficiently proximate to the bladder to ensure that the produced EM/magnetic fields can apply a sufficient force onto the bladder or enclosed fluid to overcome the viscosity of the enclosed fluid and the elastic force of the bladder.

The field sources can be comprised of electromagnetic or magnetic devices that produce an EM or magnetic field. In some embodiments, the EM field sources can be energized by the application of electrical current from a power source known to a person of ordinary skill in the art. In some embodiments, the filed sources are electrical coils, which produces an EM field when energized. In some embodiments, the field sources may be other mechanisms known to a person of ordinary skill in the art that are configured to produce magnetic or EM fields.

The present invention may include a plurality of longitudinally spaced (with respect to the longitudinal axis of the base structure) field sources configured to be energized in a longitudinally sequential manner. The power source can energize the plurality of field sources in rapid succession moving from one end of the base structure to the other and vice versa. In some embodiments, individual field sources could generate different field strengths and therefore different degrees of attraction/repulsion. In addition, the speed of the sequential energization of the array of field sources can be highly tailored. Moreover, to avoid cavitation, the sequential energization could start slowly and increase as the flow speed increases.

The spacing and operation of the field sources is sufficient to create a steady flow of the enclosed fluid from one end to the other end of the base structure. In some embodiments, the field sources are electrified similar to a propulsion system for a maglev train system. The field sources generate EM or magnetic fields that both pull the enclosed fluid and/or bladder forward from one end and push the enclosed fluid and/or bladder forward from the other end. In another embodiment, the field sources can be arranged in an array, similar to pixels on a television screen.

Figure 7:
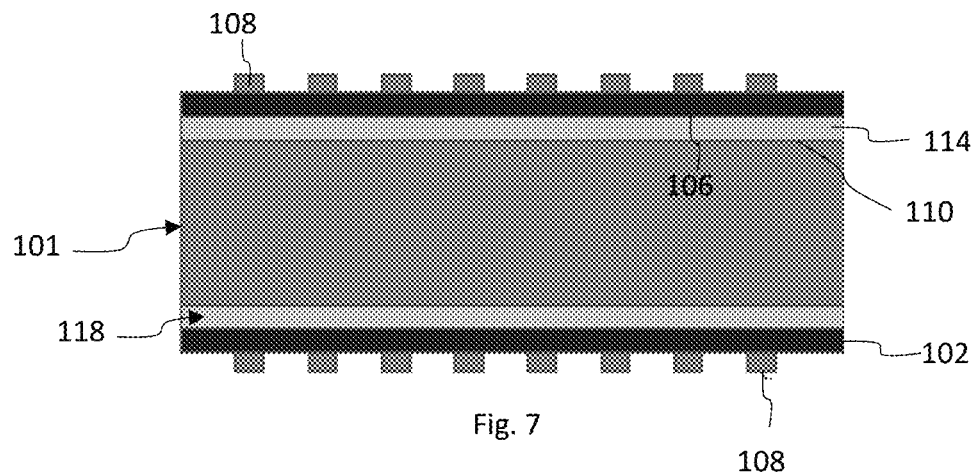
FIG. 7 is a cross-sectional view of an embodiment of the present invention in a non-energized state.

As best shown in FIG. 7, enclosed fluid 118 resides within the space between bladder 110 and inner surface 106 of outer surface 102. Bladder 110 is flexible and in some embodiments it is elastic. As a result, bladder 110 is adapted to extend inwardly in a radial direction towards the central longitudinal axis of propulsion channel 101 to at least partially occlude propulsion channel 101 as best depicted in FIGS. 8-13. The manner in which the system is reactive to occlude propulsion channel 101 is described in greater detail below.

In some embodiments, bladder 110 is comprised of a plurality of segmented bladders or subsections of bladder 110 to ensure that the occlusion occurs in a controlled manner. In some embodiments, bladder 110 is configured to occlude at least 25% of propulsion channel 101. In some embodiments, bladder 110 is configured to occlude at least 50% of propulsion channel 101. In some embodiments, bladder 110 is configured to occlude at least 90% of propulsion channel 101. In some embodiments, bladder 110 is configured to occlude roughly the entire cross-sectional area of propulsion channel 101.

In some embodiments, bladder 110 is electro-mechanically non-reactive and enclosed fluid 118 within chamber 114 is electro-magnetically reactive. Enclosed fluid 118 can be comprised of any material or elements adapted to react to an EM or magnetic field, including but not limited to ionized fluids/materials, ferric slurries/material, permanent magnets (PMs), and all other magnetically and/or electrically reactive materials.

Figure 8:
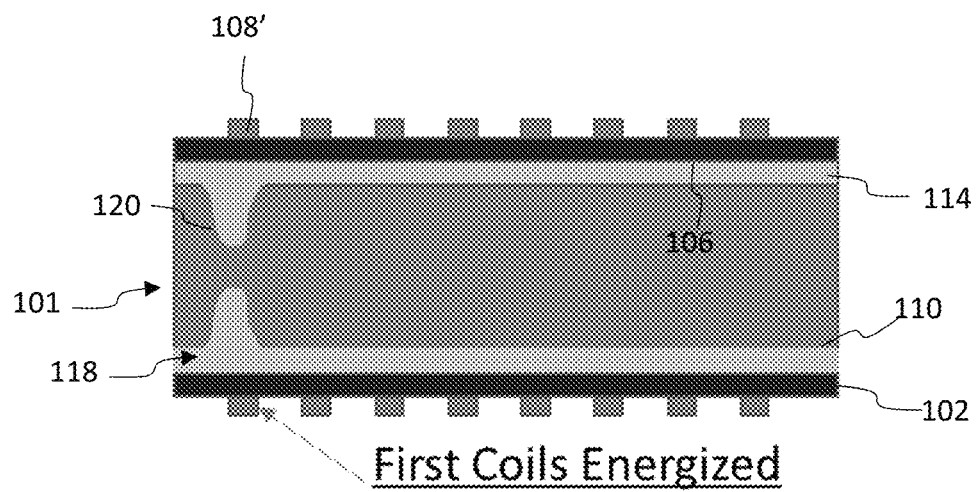
FIG. 8 is a cross-sectional view of an embodiment of the present invention in with one of the field sources in an energized state.
Figure 9:
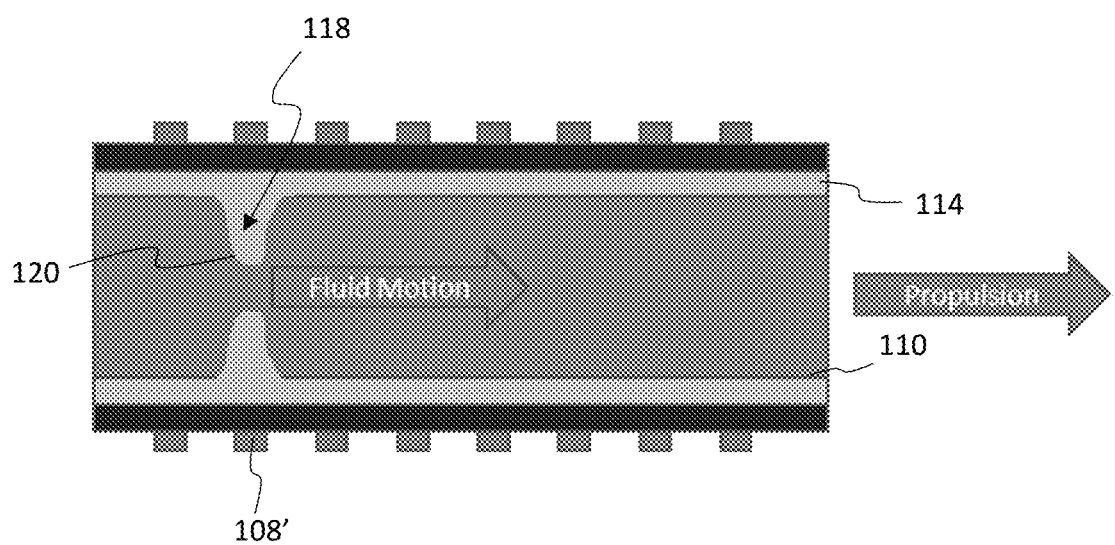
FIG. 9 is a cross-sectional view of an embodiment of the present invention in with a subsequent field source in an energized state to illustrate how the ambient fluid is propelled from the propulsion chamber.
Figure 10:
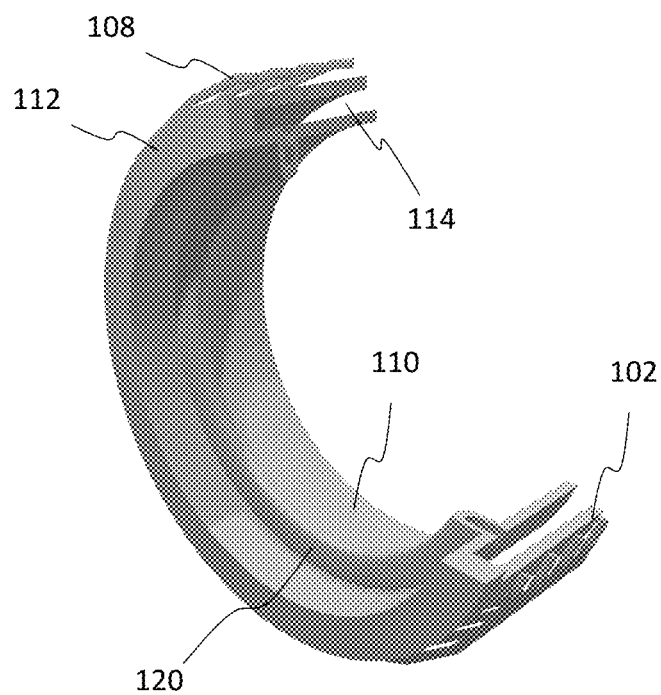
FIG. 10 is a sectional view of an end section an embodiment of the present invention with one of the field sources in an energized state.
Figure 11:
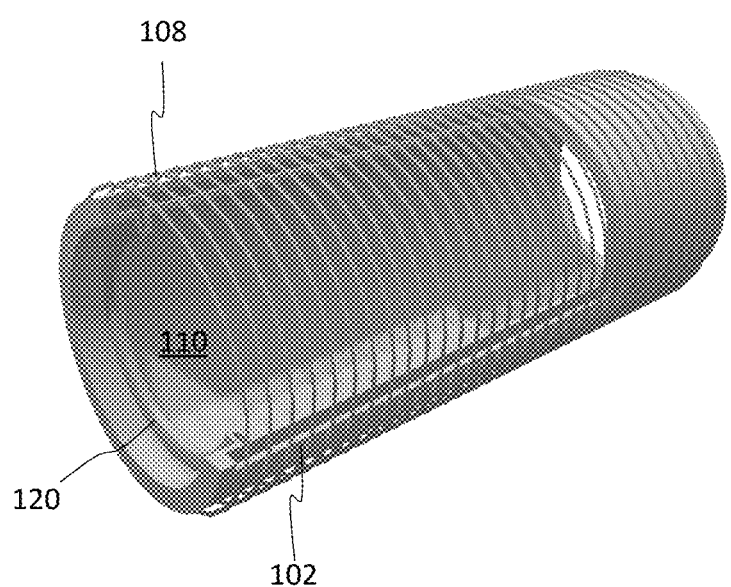
FIG. 11 is a sectional cutout view of an embodiment of the present invention to detail the internal components of the present invention with one of the field sources in an energized state.
Figure 12:
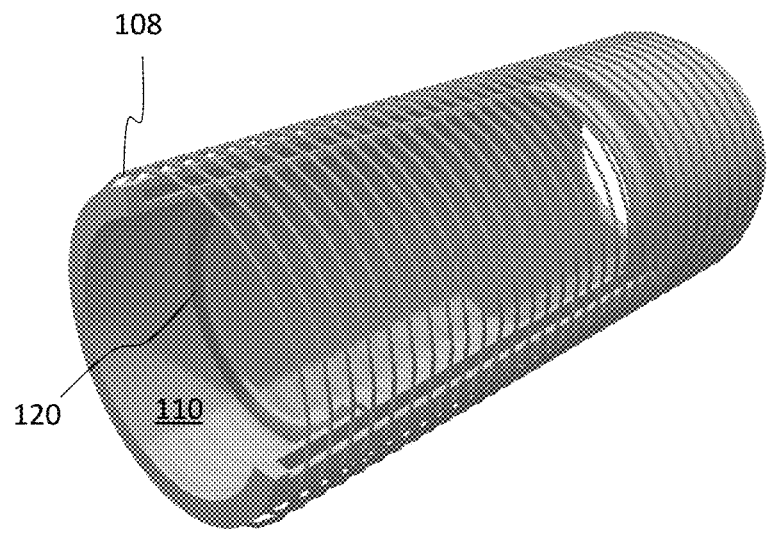
FIG. 12 is a sectional cutout view of an embodiment of the present invention to detail the internal components of the present invention with a subsequent field source in an energized state.
Figure 13:
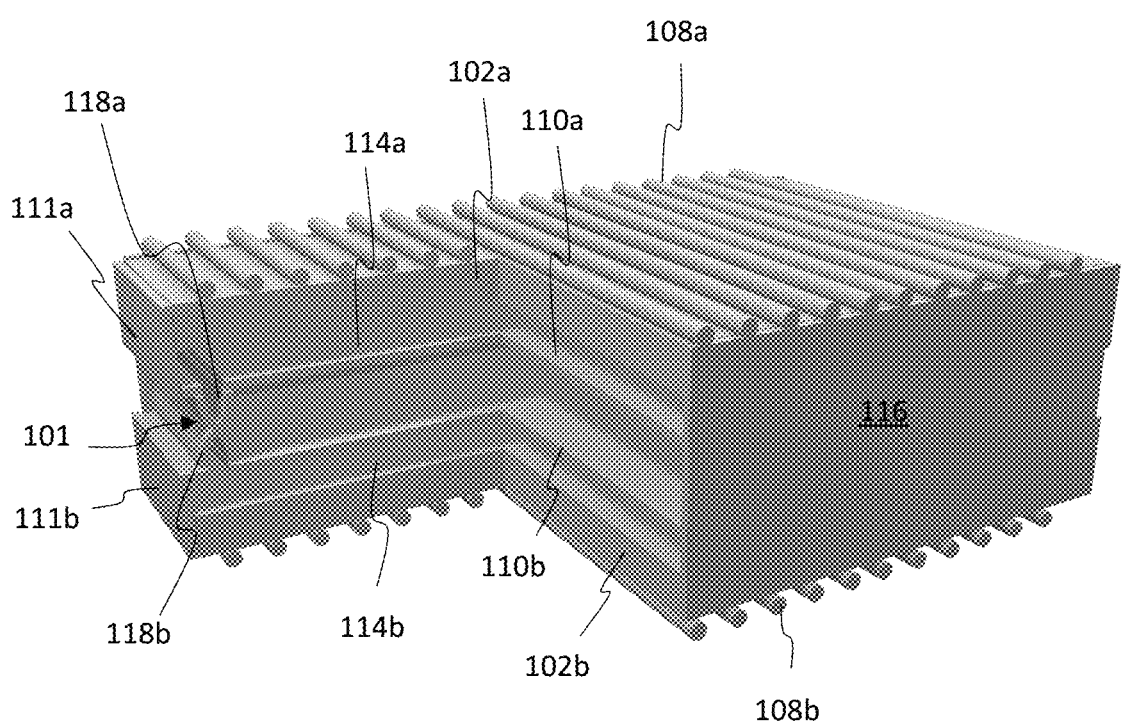
FIG. 13 is a sectional cutout view of an embodiment of the present invention to detail the internal components of the present invention with one of the field sources in an energized state.
Figure 14:
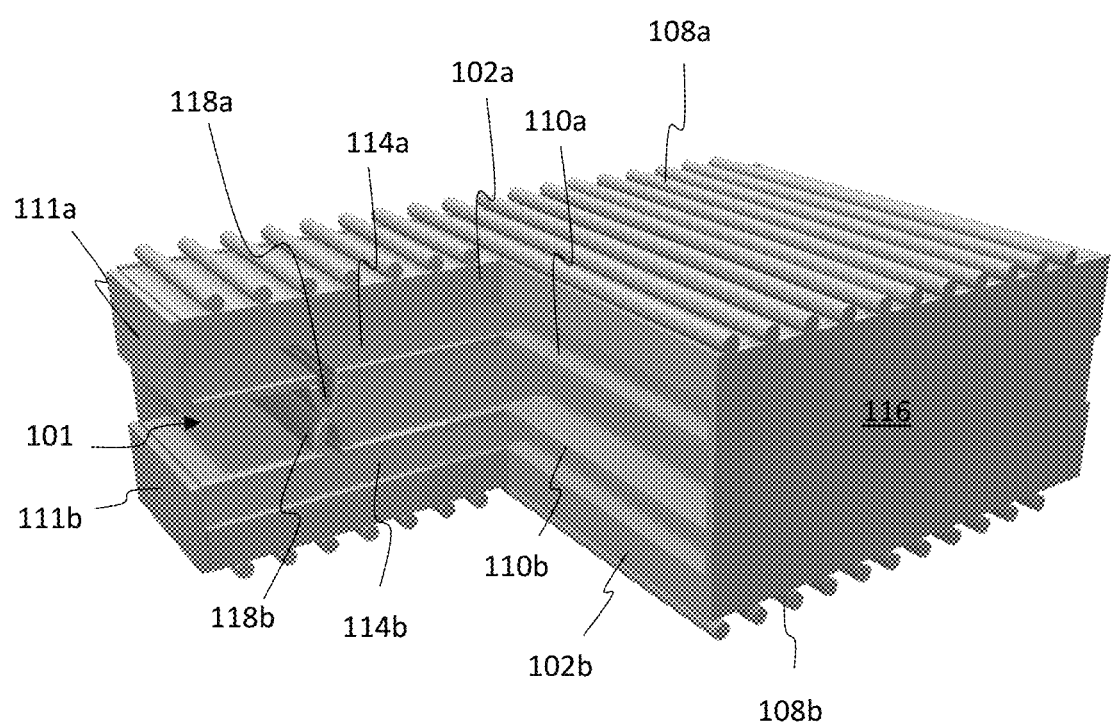
FIG. 14 is a sectional cutout view of an embodiment of the present invention to detail the internal components of the present invention with a subsequent field source in an energized state.

As exemplified in FIG. 8, the activation of one of the field sources (field source 108' in FIG. 8) creates an EM/magnetic force, which causes a mass displacement in reactive fluid 118 in the local vicinity of energized field source 108'. As shown, the EM/magnetic force attracts the reactive enclosed fluid 118. This increases local pressure of reactive fluid 118 causing bulge 120 in flexible bladder 110 resulting in a constriction/occlusion of the cross-sectional area of propulsion channel 101. This, in turn causes a displacement of the ambient fluid outside of bladder 110. Energizing subsequent rows of field sources (see FIG. 9) causes bulge 120 to travel down propulsion channel 101 to the desired exit end of propulsion channel 101. In turn, bulge 120 drives the ambient fluid outside of bladder 110 in the direction of the propagating bulge 120. In the case of a propulsion application, base structure 102 will move in the opposite direction of the displaced ambient fluid. By repeatedly energizing the sequenced field sources, propulsion of a body through the ambient fluid can be attained.

In some embodiments, the field sources are configured to repel the reactive enclosed fluid. In such embodiments, two or more longitudinally spaced field sources can be energized to repel the reactive enclosed fluid towards a void between the EM fields residing between the two energized field sources. The enclosed fluid collects in this void creating a bulge. Successive energization of longitudinally spaced field sources can move the bulge to propel the ambient fluid in the propulsion channel.

In some embodiments, enclosed fluid 118 is non-reactive, and bladder 110 is reactive. Bladder 110 may be reactive through ferric material, PMs, electromagnets, or other materials reactive to EM/magnetic fields. The reactive elements in bladder 110 can be embedded or attached to bladder 110. The activation of the EM force by one of the field sources in a row of field sources attracts or repels reactive bladder 110 in the local vicinity of the field source creating bulge 120 in bladder 110. This similarly causes a displacement of the ambient fluid outside of bladder 110. Energizing subsequent rows of field sources causes bulge 120 of bladder 110 to travel down propulsion channel 101 driving the ambient fluid outside of bladder 110 in the direction of the propagating bulge 120. In the case of a propulsion application, base structure 102 will move in the opposite direction of the displaced ambient fluid.

In some embodiments, both enclosed fluid 118 and bladder 110 are reactive. Energizing the one or more field sources causes both enclosed fluid 118 and bladder 110 to create one or more bulges 110. Additionally, the system could be implemented by having electromagnetically opposite polarity features on both the bladder and the base structure.

In some embodiments, the bladder is filled to a capacity in which a majority of the propulsion channel is occluded when the field sources are in a non-energized state. The field sources are configured to attract or repel the reactive enclosed fluid and/or reactive elements on the bladder to move the bladder towards the base structure thereby creating a void. The void creates a vacuum through volume displacement and in turn causes the ambient fluid to move in the direction of the void. Successive energization of field sources can move the void to propel the ambient fluid in the propulsion channel.

In some embodiments, by using any combination of the reactive and passive elements described above, actuation of one or more field sources could be used to develop highly complex mixing or fluid flow patterns. For example, multiple bulges can be created and driven towards each other to maximize turbulence within the propulsion channel.

By tailoring the material properties of the base structure, field sources, enclosed fluid and bladder, various fluid displacement effects could be achieved. For example, high velocity transfer of ambient fluid would be effectively achieved if the enclosed fluid were low viscosity or gaseous with a highly flexible bladder and a rigid base structure. Slower, more mechanically powerful displacements (for mixing materials) would be facilitated by higher viscosity enclosed fluids or ferric slurries.

To achieve a broad range of effects, current levels to the various rows of field sources can be adjusted to obtain specific reactions within the enclosed fluid. Moreover, increasing or decreasing the energy to the field sources shapes the deformation of the bladder and therefore the influence on the ambient fluid.

Some embodiments employ permeable or osmotic bladder materials to alter the chemical or ionic composition of either or both of the enclosed or ambient fluids.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A fluid propulsion system, comprising:
    a hollow main body comprised of a base structure, a non-rigid bladder, and an enclosed fluid;
    a propulsion channel extending through the hollow main body, wherein the propulsion channel is configured to receive ambient fluid;
    a plurality of longitudinally spaced field sources connected to a power source, wherein each field source can be energized via a power source to create a magnetic field or an electromagnetic field;
    the enclosed fluid adapted to react to the magnetic field or the electromagnetic field created by an energized field source;
    the bladder having an adjustable shape configured to alter an amount of occlusion of the propulsion channel when the enclosed fluid reacts to the magnetic field or the electromagnetic field created by an energized field source; and
    the plurality of field sources configured to be sequentially energized to change the shape of the bladder thereby displacing the ambient fluid in the propulsion channel.

2. The fluid propulsion system of claim 1, wherein the base structure is in the shape of a hollow cylindrical tube.

3. The fluid propulsion system of claim 1, wherein the base structure includes two opposing plates spaced apart to create the propulsion channel.

4. The fluid propulsion system of claim 1, wherein each of the plurality of field sources is comprised of a coil.

5. The fluid propulsion system of claim 1, wherein each of the plurality of field sources resides within the base structure.

6. The fluid propulsion system of claim 1, wherein each of the plurality of field sources resides adjacent to an outer surface of the base structure.

7. The fluid propulsion system of claim 1, further comprising reactive elements in mechanical communication with the bladder, wherein the reactive elements are configured to reactively move in response to the magnetic field or the electromagnetic field of the energized field source.

8. The fluid propulsion system of claim 1, wherein the enclosed fluid in the bladder is repelled by the magnetic field or the electromagnetic field of the energized field source.

9. The fluid propulsion system of claim 1, wherein the enclosed fluid in the bladder is attracted to the magnetic field or the electromagnetic field of the energized field source.

10. A fluid propulsion system, comprising:
    a hollow main body comprised of a base structure, a bladder, and an enclosed fluid;
    a propulsion channel extending through the hollow main body, wherein the propulsion channel is configured to receive ambient fluid;
    a plurality of longitudinally spaced field sources connected to a power source, wherein each field source can be energized via a power source to create a magnetic field or an electromagnetic field;

the bladder further including an adjustable shape and one or more reactive elements adapted to react to the magnetic field or the electromagnetic field created by an energized field source;

wherein the bladder is configured to alter an amount of occlusion of the propulsion channel when the shape of the bladder is changed in response to the magnetic field or the electromagnetic field created by the energized field source and the plurality of field sources are adapted to be sequentially energized to alter the shape of the bladder thereby displacing the ambient fluid in the propulsion channel.

11. The fluid propulsion system of claim 10, wherein the base structure is in the shape of a hollow cylindrical tube.

12. The fluid propulsion system of claim 10, wherein the base structure includes two opposing plates spaced apart to create the propulsion channel.

13. The fluid propulsion system of claim 10, wherein each of the plurality of field sources is comprised of a coil.

14. The fluid propulsion system of claim 10, wherein each of the plurality of field sources resides within the base structure.

15. The fluid propulsion system of claim 10, wherein each of the plurality of field sources resides adjacent to an outer surface of the base structure.

16. The fluid propulsion system of claim 10, wherein the enclosed fluid is adapted to react to the magnetic field or the electromagnetic field of the energized field source.

17. The fluid propulsion system of claim 10, wherein the reactive elements in the bladder are repelled by the magnetic field or the electromagnetic field of the energized field source.

18. The fluid propulsion system of claim 10, wherein the reactive elements in the bladder are attracted to the magnetic field or the electromagnetic field of the energized field source.

19. A fluid propulsion system, comprising:
a hollow main body comprised of a base structure, a non-rigid bladder, and an enclosed fluid;
a propulsion channel extending through the hollow main body, wherein the propulsion channel is configured to receive ambient fluid;
a plurality of longitudinally spaced field sources connected to a power source, wherein each field source can be energized via a power source to create a magnetic field or an electromagnetic field;
one or more reactive elements adapted to react to the magnetic field or the electromagnetic field created by an energized field source, wherein the one or more reactive elements are configured to alter a shape of the bladder when subject to the energized field source;
wherein the bladder is configured to alter an amount of occlusion of the propulsion channel when the shape of the bladder is changed in response to the magnetic field or the electromagnetic field created by the energized field source and the plurality of field sources are adapted to be sequentially energized to alter the shape of the bladder thereby displacing the ambient fluid in the propulsion channel.

* * * * *